United States Patent [19]
Herbst

[11] Patent Number: 4,533,061
[45] Date of Patent: Aug. 6, 1985

[54] FOOD TRAY AND LID WITH SEALED PANELS AND METHOD OF FORMING SAME

[75] Inventor: Walter B. Herbst, Evanston, Ill.

[73] Assignee: American Hospital Supply Corporation, Evanston, Ill.

[21] Appl. No.: 76,516

[22] Filed: Sep. 17, 1979

[51] Int. Cl.³ ................... B65D 6/32; A45C 11/20
[52] U.S. Cl. ................... 220/4 B; 220/76; 220/81 R; 220/359; 220/469; 220/902; 206/545
[58] Field of Search ............. 220/4 B, 4 C, 23.6, 75, 220/76, 81 R, 359, 427, 469, 902; 206/545

[56] References Cited
U.S. PATENT DOCUMENTS

| | | | |
|---|---|---|---|
| 616,929 | 1/1899 | Joans | 220/359 |
| 2,438,546 | 3/1948 | Davis | 220/427 |
| 2,656,946 | 10/1953 | Clarke . | |
| 3,016,129 | 1/1962 | King . | |
| 3,215,304 | 11/1965 | Roche | 220/359 |
| 3,454,179 | 7/1969 | Kerr | 220/81 R |
| 3,532,247 | 10/1970 | Bridges | 206/545 |
| 3,613,933 | 10/1971 | Pilz . | |
| 3,754,640 | 8/1973 | Bridges . | |
| 3,799,386 | 3/1974 | Madalin . | |
| 3,825,148 | 7/1974 | Hunter | 220/359 |
| 3,828,967 | 8/1978 | Grabhorn . | |
| 3,850,333 | 11/1974 | Recihert . | |
| 3,928,567 | 3/1960 | Davis | 220/4 B |

*Primary Examiner*—George E. Lowrance
*Attorney, Agent, or Firm*—Michael P. Bucklo

[57] ABSTRACT

An insulated food serving tray or lid therefore which includes a pair of preformed thermoplastic panels bonded together about a peripheral seam to permanently encase an insulator within a chamber between the panels. At the peripheral seam area, a first panel has an outwardly extending ledge area with a retaining lip. The second panel has a peripheral tongue area that fits inside the lip of the first panel. The panels are joined between the lip and tongue by a bonding material to provide a peripheral seam that is protected from fracture when the tray or lid is laterally banged at the peripheral seam area during handling. A method of forming the tray or lid is disclosed which includes forming the tray or lid with a gap between the insulation and panels at the time of assembly.

8 Claims, 6 Drawing Figures

FOOD TRAY AND LID WITH SEALED PANELS AND METHOD OF FORMING SAME

BACKGROUND

Insulated food serving trays and lids therefore formed of a thermoplastic shell which permanently encases an insulating material are known. The examples are U.S. Pat. Nos. 3,532,247, 3,754,640 and 3,799,386. These insulated trays and lids are generally formed by sealed together two panels to form a hollow shell. Through a small opening in the shell, a material is injected and expanded to fill the intricately shaped chamber between the two panels. A polyurethane foam has generally been used with a "foamed-in-place" process. Such "foamed-in-place" insulated trays and lids have a serious disadvantage in that the polyurethane tends to continually expand with time and exert an internal pressure on the seam area of the tray. Also, with temperature changes during hot water washing, at over 200° F. the foam can exert an additional pressure on the seam area which can cause it to rupture.

It is important that the seam area between the two panels have a very high degree of structural integrity. Any minute gap or fracture can permit dishwater to enter the insulated chamber between the panels where it may be possible for bacteria to grow. Since the panels are of a thermoplastic material, they cannot be as firmly or as readily crimped and rolled as metal panels can. The thermoplastic tray and lid are much preferred over metal units because of their lighter weight and attractiveness.

In the past the thermoplastic panels of the insulated food trays and lids have been bonded together in a generally horizontal bond between two horizontal flanges about the periphery of the tray or lid. The patents mentioned above, as well as U.S. Pat. No. 3,613,933, show these horizontal flange seals. Tray, U.S. Pat. No. 3,613,933, shows the type of prior art seals. Although the lid of this patent does have a short downturn skirt to position the lid up on the tray, the primary sealing area would be in the horizontal area as in the tray of this patent.

The face to face bond between two horizontal flanges of the thermoplastic insulated trays and lids of the past have had serious disadvantages. First, the outer edges of the two flanges provided a somewhat rough and unsightly narrow or knife-like edge which was particularly exaggerated if the two flanges were not perfectly flush and smooth at their outer hinge. Secondly, the internal pressure created on the horizontal beams because of the "foamed-in-place" polyurethane insulating material tended to create a peeling action at the seam area caused by the vertical expansion of the foam.

Perhaps one of the most serious problems with the horizontal seams of the prior art thermoplastic food trays and lids has been the failure of such seams during lateral banging in the seam area when handling the trays and lids during washing, filling and stacking, etc. It should be noted that when two trays are placed on a table top their horizontal seams are aligned with each other much in the same way as bumpers on automobiles. When the trays are moved quickly along a filling track or other structure, violent banging of the trays can and does occur. The shock of such banging frequently occurs in a very narrow area of the seam, such as a curved corner or curved end. The shock causes localized distortion of the two halves and tensile failure of the weak butt joint. This is particularly a problem when combined with the internal pressure caused by "foamed-in-place" material generating a peeling action on the horizontal seam.

SUMMARY OF THE INVENTION

The present invention overcomes the above problems with thermoplastic panels permanently encasing an insulator to form a food tray or lid therefore. This invention provides a very sturdy seam area that can withstand substantial lateral banging without failure, is easy to form, and readily accepts manufacturing tolerances of the two panels. A first panel has a peripheral ledge portion with a retaining lip, and a second panel has a peripheral tongue portion fitting against the ledge portion inside the lip. A solvent or other type bond between the ledge and tongue firmly secures the two panels together. The lip which, preferably is in a generally vertical position can take considerable lateral banging without placing a sheering or peeling stress on the seam. A method of forming the tray or lid provides a gap between at least the portion of the insulator and the sealed panels is described.

THE DRAWINGS

DETAILED DESCRIPTION

Figure 1:
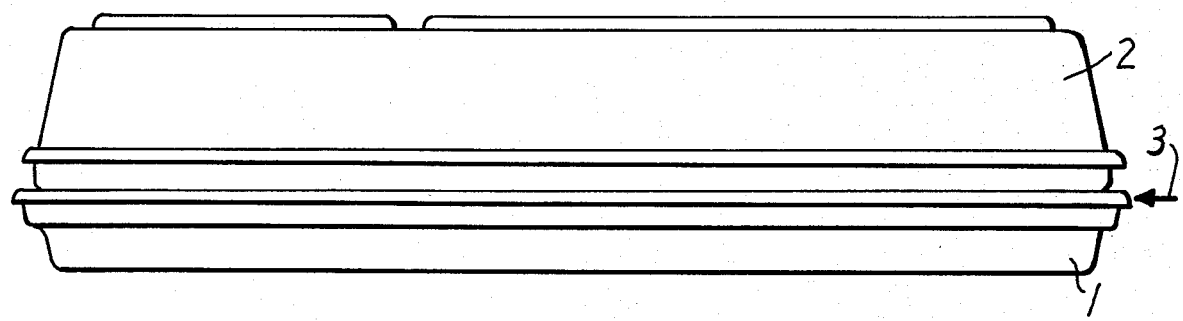
FIG. 1 is a front elevational view of an assembled insulated tray and lid.

In FIG. 1, an insulated food tray 1 which is covered by an insulated lid 2 is shown in the process of absorbing a lateral bang or jolt at a peripheral seam area as designated by arrow 3. Such lateral banging has caused problems with prior food serving trays used in hospitals and other institutions because the banging fractured a seam of the tray or lid.

Figure 2:
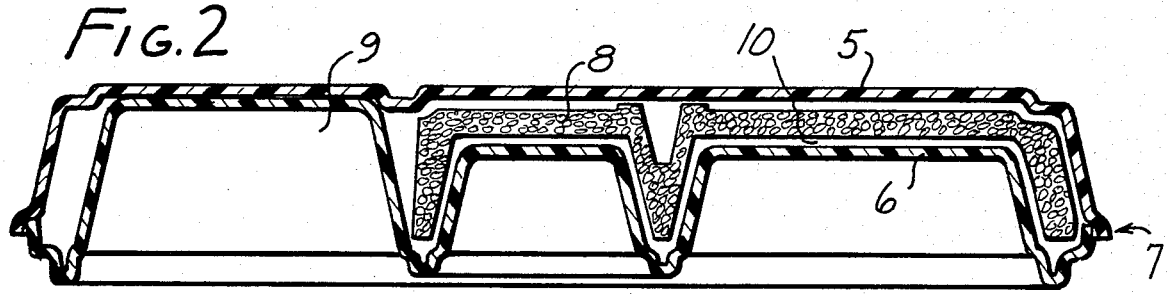
FIG. 2 is a sectional view of the lid for the tray showing an insulator permanently sealed between two thermoplastic panels joined at a peripheral seal.

The sectional view of the lid shown in FIG. 2 illustrates that a top panel 5 and bottom panel 6 which are joined at a peripheral seam area shown generally at 7 encases a preformed rigid foam insulator 8. A polystyrene bead foam works very well. This insulator is preferably formed with a plurality of dish cavities for fitting over food containing plates (not shown) within the enclosure of the lidded tray. In FIG. 2 the bottom panel 6 has complimentary dish cavities for fitting within the dish cavities of the insulator. The lid is formed with a noninsulated section 9 which can be used to cover the beverage section or utensil section of the tray. The physical construction of the tray and lid which provides a gap 10 between at least a portion of the insulator and the panels is described in a separate co-pending, co-owned application, Ser. No. 076,517, filed the same day as the present application.

Figure 3:
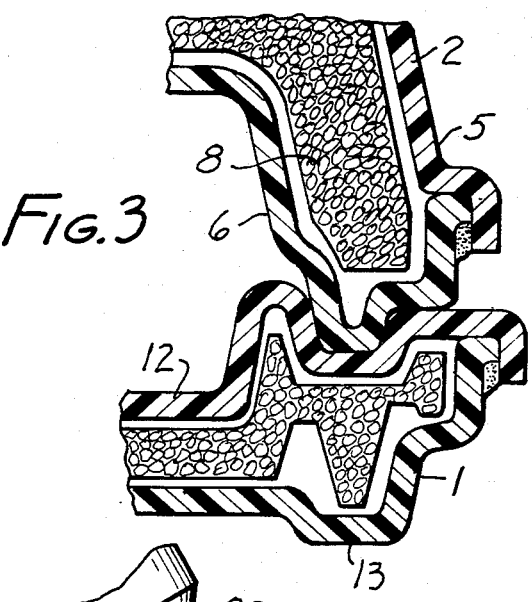
FIG. 3 is an enlarged sectional view of the interfitting relationship between the lid and tray at the right end of FIG. 1.

The tray 1 and lid 2 have an interfitting tongue and groove construction as shown in FIG. 3. Although for purposes of illustration, only the details of the insulated lid has been shown in FIG. 2. However, it is understood that the joint between the two panels of the lid can be essentially the same as the joint between the top panel 12 and bottom panel 13 of the tray. In the lid, the dish cavities are in the bottom panel, wherein the tray the dish cavities are in the top panel.

Figure 4:
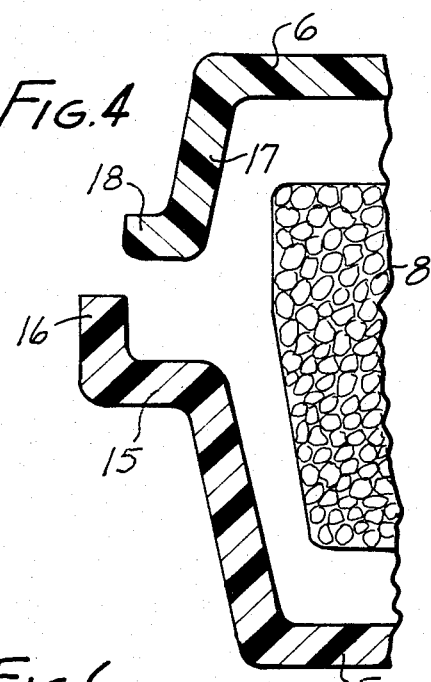
FIG. 4 is an enlarged fragmentary sectional view showing the insulator and two panels in the process of being assembled.

During assembly of the tray or lid, the performed thermoplastic insulator such as 5 is formed according to the intricate shape of FIG. 2. Next the panels 5 and 6 are assembled around the insulator. As shown in FIG. 4, the panels are inverted with the normally top panel 5 being the lower most panel. In FIG. 4 the panel 5 has an outwardly extending ledge portion 15 which has at its outer end an upstanding generally vertical lip 16. Panel 6 has a peripheral tongue portion 17 with an outwardly flared end 18. The panels are so assembled that flared end 18 fits inside lip 16.

Figure 5:
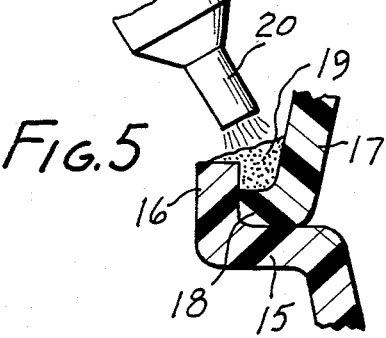
FIG. 5 is a fragmentary sectional view showing application of bonding material to the seam area.
Figure 6:
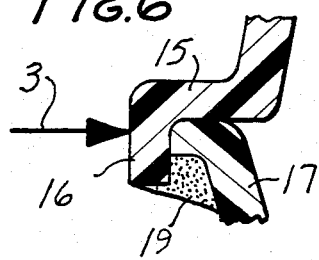
FIG. 6 is a fragmentary sectional view showing the bonded panel being subjected to a lateral banging.

When the two panels are assembled as is shown in FIG. 5, the outwardly flared end 18 acts as a laterally extending spacer between lip 16 and peripheral tongue portion 17, thereby providing a lateral gap on the side of flared end 18 opposite ledge portion 15 which is protected by lip 16 as is best illustrated by FIGS. 5 and 6. Within this gap is applied a bonding material 19. Bonding material 19 is shown in FIG. 5 being applied from a dispensing nozzle 20 to form a smooth fillet. It has been found that the bonding of the two thermoplastic panels works very well when material of the panels themselves which may have a beige or pleasant color is ground up into small dissolvable particles and dissolved in a solvent for the thermoplastic material. Thus, the viscosity of the bonding solvent as well as its color can be controlled for forming a smooth fluid of the bonding material between the upstanding lip of the ledge portion of one panel and the tongue portion of the other panel.

Once formed, the two panels are inverted as shown in FIG. 6 which is the normal position of the lid in FIG. 2. As shown in FIG. 6, the joint acts as a sturdy bumper with generally vertically lip 16 acting as the protector for the bond joint 19. The schematic force arrow 3 of a vigorous banging does not break or rupture the joint. It is preferable to have the bonding material 19 located at a bottom area of the joint because this gives a slightly smoother appearance to the top of the ledge portion 15.

The method of forming the lid as explained above includes preforming the insulator material with the plural dish cavities and confining it between the two panels 5 and 6 in forming the peripheral seals in a manner that insures at least a portion of the insulator is spaced from the panels to prevent undue internal pressure on the peripheral seam. The panels can be manually pinched against the insulator for checking the presence of the gap.

Various thermoplastic materials can be used for the panels, and it is preferable that such panels be formed by a vacuum or pressure molding from sheet material. Because the top and bottom panels are separately formed and assembled as shown, there is no need to foam the insulating material in place or to fill the space between the panels with loose insulating material.

In the foregoing specification, the specific example has been used to describe the invention; however, it is understood by those skilled in the art that modifications can be made to this example without departing from the spirit and scope of the invention.

I claim:

1. A food serving tray or lid therefore which includes an insulator permanently encased between thermoplastic top and bottom panels wherein the improvement comprises: a peripheral ledge portion formed on one panel, said ledge having a generally horizontal section and retaining lip formed thereon extending in a generally vertical direction when the tray is in a horizontal position; a peripheral tongue portion formed on the other panel, said tongue having a laterally extending spacer portion fitting against the ledge portion inside lip to provide a lateral gap between said lip and tongue on the side of said spacer portion opposite said ledge portion; and a bonding material between said lip and tongue portions providing a peripheral seam that is protected from fracture when the tray is laterally impacted about said lip during handling.

2. A tray or lid therefore as set forth in claim 1 wherein the spacer is an outwardly flared end of the tongue portion.

3. A tray or lid therefore as set forth in claim 1 wherein the bond is a solvent bond.

4. A tray or lid therefore as set forth in claim 3, wherein the solvent bond includes dissolved particles of a thermoplastic material compatible with the two panels.

5. A tray or lid therefore as set forth in claim 4 wherein the bonding material includes dissolved particles of the same material as the panels.

6. A tray or lid therefore as set forth in claim 5, the insulator is a preformed rigid thermoplastic bead foam.

7. A tray or lid therefore as set forth in claim 6, wherein the preformed bead foam is polystyrene.

8. A tray or lid therefore as set forth in claim 7, wherein the insulator has a portion that is spaced from the panels so as to minimize internal pressure at the seam area.

* * * * *